UNITED STATES PATENT OFFICE.

OTTO LOUIS MORITZ ABRAMOWSKI AND FERDINAND ROSING, OF MILDURA, VICTORIA, AUSTRALIA.

FOOD COMPOSITION.

No. 924,411.

Specification of Letters Patent.

Patented June 8, 1909.

Application filed August 4, 1908. Serial No. 446,970.

*To all whom it may concern:*

Be it known that we, OTTO LOUIS MORITZ ABRAMOWSKI and FERDINAND ROSING, subjects of the King of Great Britain and Ireland, &c., residing at Mildura, in the State of Victoria, Commonwealth of Australia, have invented certain new and useful Improvements in and Relating to Food Compositions; and we do hereby declare the following to be a full, clear, and exact description of the invention, such as will enable others skilled in the art to which it appertains to make and use the same.

This invention relates to food compositions and has for its object the production of such a composition which will be palatable, wholesome, easy to prepare, will keep of itself and will not require cooking before serving.

To these ends the invention consists in the compound and its equivalents hereinafter disclosed, and particularly pointed out in the claims.

It is well known that fresh fruit is a most valuable human food element, but it is not available all the year around nor will it keep fresh long; nor is it so complete in its nourishing qualities as is desirable. Nuts, on the other hand, supply important elements of nourishment which fruit lacks, but in their natural state many persons find difficulty in digesting them. Again, fresh fruit taken alone is not generally economical; not only on account of its deficiency in nutritive elements, but there is a considerable amount of waste in the seeds, stalks and so forth.

This invention accomplishes the above objects and overcomes these objections by intimately mixing or combining fruits and nuts, so that the incorporated constituents lose their separate identity, whereupon they can be eaten as one food.

Since the constituents are comparatively inexpensive, this food is remarkably cheap, and it may before eating be warmed or cooked if desired, but cooking does not better it nor does it form a part of this invention.

This food when made is always available as a complete food, and constitutes a composition of matter which will supply every food element other than water which man needs. In addition it is economical, and possesses marked advantages over, and avoids the disadvantages incidental to what are called "preserved" foods, besides avoiding the disadvantages entailed by cooking, which not only means needless expense, but seriously reduces the nutritive values. Furthermore, this food will keep for a very prolonged period in a solid wholesome condition without canning, or the use of any express "preservative".

Again, this food avoids the disadvantages of those foods which supply only some dietary requirements of the human system, and it comprises the advantages of compactness and concentration which are so important commissariat considerations. Fruit in a dried state, and nuts eaten separately, would not be at all satisfactory, as a food ration to be used on short notice. But dried fruit, such as dried grapes and nuts prepared as hereinafter described, constitute a very satisfactory emergency ration. It has never hitherto been obvious that these two substances could be formed into a composition having the special advantages indicated. But upon reflection it will be seen that nuts have a dryness and even when dried into raisins, grapes contain considerable moisture, sugar, and other ingredients. Now by reason of the binding and other qualities of the said moisture and sugar, and other ingredients of dried grapes, the latter, when suitably united with dry nuts, form a cohering compound wherein the important result is attained that the constituents act not only as food, but the grape constituents also act as a natural preservative of great effectiveness.

The nut meat may be broken, shredded, milled or otherwise divided to any predetermined fineness, and in some cases part of its fat is removed. Cocoanut when desiccated and powdered is suitable.

The process of producing the food consists in taking fruits, such as dried grapes, for example, seeded raisins, sultanas or currants, or a combination of these, particularly raisins and sultanas mixed in equal proportions, and adding thereto preferably from about one sixteenth to one sixth of their weight of broken, ground, shredded, milled or other suitably divided cocoanut, almonds, or other nuts, the proportion of nuts being always much below that of the fruit.

In some cases there may be added in a dried or a divided state, and as a minor proportion of the whole, other non-animal foods, such as fruit which in its ripe state is soft, for example apples, pears, apricots, peaches, plums, olives or bananas. It is also practicable to season, sweeten or flavor these additions by adding suitable quantities of cane, beet, or maple sugar, honey, glucose, dextrin, vanilla, coffee, cocoa or fruit extracts.

The ingredients may be incorporated by a cutting, kneading or mixing machine into a plastic mass from which in the process air is thoroughly expelled. The mass is dried, compressed in molds, or extruded from one or more apertures, to form solid slabs, blocks or rods of any suitable cross section, and such solids are then cut into proper sizes and shapes for commerce. Owing to its peculiar constituents this mass will not so harden as to render it incapable of being eaten, being in that respect entirely different from dried apples, apricots, or like fruits which when dried cannot be eaten unless cooked or steamed.

What we claim as our invention and desire to secure by Letters Patent of the United States is:—

1. A self preserving food composition adapted for immediate eating comprising a dried mass of finely divided intimately mixed grape and nut constituents compressed together into a solid form, substantially as described.

2. A self preserving food composition adapted for immediate eating comprising a dried mass of finely divided intimately mixed grape, nut and other fruit constituents mixed with a flavoring extract, the whole proportioned substantially as specified and compressed together into a solid form, substantially as described.

3. A self preserving food composition adapted for immediate eating comprising a dried mass of finely divided raisins and between one sixteenth and one sixth the weight thereof of finely divided nuts, the whole intimately mixed and compressed into a solid form, substantially as described.

4. A self preserving food composition adapted for immediate eating comprising a dried mass of finely divided raisins mixed with a flavoring extract and between one sixteenth and one sixth the weight thereof of finely divided nuts, the whole intimately mixed and compressed into a solid form, substantially as described.

In testimony whereof we affix our signatures in presence of two witnesses.

OTTO LOUIS MORITZ ABRAMOWSKI.
  FERDINAND ROSING.

Witnesses:
 JAMES MUIR,
 H. PRISTELY.